(12) United States Patent
Hager et al.

(10) Patent No.: US 7,802,817 B1
(45) Date of Patent: Sep. 28, 2010

(54) BUILDING TRUSS TRANSPORT TRAILER DEVICE

(75) Inventors: James L. Hager, Fall Creek, WI (US); David B. Sundly, Augusta, WI (US)

(73) Assignee: Northwest Enterprises, Inc., Eau Claire, WI (US)

( * ) Notice: Subject to any disclaimer, the term of this patent is extended or adjusted under 35 U.S.C. 154(b) by 805 days.

(21) Appl. No.: 11/725,199

(22) Filed: Mar. 19, 2007

(51) Int. Cl.
*B62D 63/08* (2006.01)
*B60P 3/40* (2006.01)
(52) U.S. Cl. .......................... 280/789; 414/485; 410/44
(58) Field of Classification Search ................ 280/789; 414/485; 410/44
See application file for complete search history.

(56) References Cited

U.S. PATENT DOCUMENTS

| | | | |
|---|---|---|---|
| 2,497,072 A * | 2/1950 | Cooper ................. 280/124.13 |
| 2,564,255 A * | 8/1951 | Haydock .................... 239/656 |
| 2,848,126 A * | 8/1958 | Taylor ........................ 414/483 |
| 2,999,693 A * | 9/1961 | Thorson ...................... 410/42 |
| 3,091,498 A | 5/1963 | Goodwin |
| 3,154,207 A * | 10/1964 | Long ............................ 414/485 |
| 3,221,911 A | 12/1965 | Modloff et al. |
| 3,399,791 A | 9/1968 | Goodwin |
| 3,429,465 A * | 2/1969 | Gardner ....................... 414/522 |
| 3,684,308 A * | 8/1972 | Steinke ........................ 280/140 |
| 3,724,696 A | 4/1973 | Leeper |
| 3,854,615 A | 12/1974 | List |
| 4,184,694 A * | 1/1980 | Porter .......................... 410/44 |
| 4,576,398 A | 3/1986 | Kinne |
| 4,750,738 A | 6/1988 | Dang |
| 4,997,332 A * | 3/1991 | Johnson ....................... 414/534 |
| 5,017,081 A | 5/1991 | Helton |
| 6,955,384 B1 * | 10/2005 | Good ............................. 296/3 |
| 7,258,362 B2 * | 8/2007 | Thurm ........................ 280/656 |

* cited by examiner

*Primary Examiner*—Lesley Morris
*Assistant Examiner*—Daniel Yeagley
(74) *Attorney, Agent, or Firm*—Tipton L. Randall

(57) ABSTRACT

A building truss transport trailer device adapted for transporting upright or inverted building trusses. The base of the transport trailer device comprises a horizontal bed frame section, having top and bottom sides and a longitudinal axis. The bed frame section is supported on a set of wheels attached to the bottom side thereof. The bed frame section includes a tongue and hitch member adapted for attachment to a towing vehicle. A vertical support frame section extends from the top side of the bed frame section and is positioned along the longitudinal axis thereof. A fastening system is attached to the bed frame and adapted for fastening a plurality of upright or inverted building trusses, positioned on the bed frame section and against the vertical support frame section, to the trailer device for transport thereof.

10 Claims, 3 Drawing Sheets

BUILDING TRUSS TRANSPORT TRAILER DEVICE

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a building truss transport device and, most particularly, to a building truss transport trailer device.

2. Background Information

Building trusses are widely used for construction of buildings, particularly the roofs of dwellings. The building trusses are fabricated at a central location and then transported to the building site. Prefabrication of the building trusses allows for highly uniform trusses that are quickly attached to the support structure of the building being erected.

Building trusses are most often triangular shaped with a flat bottom on which the building truss rests when in place. The sloping sides of the building truss provide the desired pitch of the resulting roof of the structure.

Because of their triangular shape, special trucks and trailers have been developed for transporting building trusses to the building site. These specialized trucks and trailers are expensive to build and maintain. Some of these transporting devices have been granted patents, including U.S. Pat. No. 3,091,498 by Goodwin; U.S. Pat. No. 3,219,211 by Malcom; U.S. Pat. No. 3,221,911 by Modloff et al.; U.S. Pat. No. 3,399,791 by Goodwin; U.S. Pat. No. 3,724,696 by Leeper; U.S. Pat. No. 3,854,615 by List; U.S. Pat. No. 4,576,398 by Kinne; U.S. Pat. No. 4,750,738 by Helton and U.S. Pat. No. 5,017,081 by Helton.

Applicants have developed a building truss transport trailer device for transporting inverted or upright building trusses. The trailer device of the present invention is inexpensive to fabricate and can be pulled, fully loaded with building trusses, by a standard pickup truck or similar towing vehicle.

SUMMARY OF THE INVENTION

The invention is directed to a building truss transport trailer device, adapted for transporting vertically oriented, upright or inverted building trusses. The base of the transport trailer device comprises a horizontal bed frame section, having top and bottom sides and a longitudinal axis. The bed frame section is supported on a set of wheels attached to the bottom side thereof. The bed frame section includes a slot perpendicular to the longitudinal axis, adapted for receiving a point of a building truss. The bed frame section also includes a tongue member with a terminal hitch member, adapted for attachment to a towing vehicle. A vertical support frame section extends from the top side of the bed frame section and is positioned along the longitudinal axis thereof. A fastening system is attached to the bed frame and adapted for fastening a plurality of vertically oriented, upright or inverted building trusses, positioned on the bed frame section and against the vertical support frame section, to the trailer device for transport thereof.

In a preferred embodiment of the invention, the bed frame section of the building truss transport trailer device has a diamond shape, and the tongue member with a terminal hitch member extends from a point of the diamond shape bed frame section, on the longitudinal axis thereof. More preferably, the set of wheels includes a pair of axles, bracketing the slot of the bed frame section, with a wheel at each end of each axle. More preferably, the vertical support frame section includes a plurality of vertical support members positioned on the longitudinal axis of the bed frame section with bracing members there between. Most preferably, the plurality of vertical support members includes a vertical support member extending from each point of the diamond-shaped bed frame section, and a vertical support member extending from a center point of the bed frame section. Most preferably, the fastening system comprises at least about two ratcheting strap assemblies, each anchored to the bed frame member and adapted for encircling and fastening a plurality of vertically oriented, upright or inverted building trusses, positioned on the bed frame section and against the vertical support frame section, to the trailer device for transport thereof.

In a further embodiment of the invention, the building truss transport trailer device includes a pair of fender members, with each fender member secured to one edge of the bed frame section over the wheel at one end of each axle. Additionally, the building truss transport trailer device includes a running lights system secured to the trailer device and adapted for connection to the electrical system of a towing vehicle.

DESCRIPTION OF THE EMBODIMENTS

Nomenclature

Figure 1:
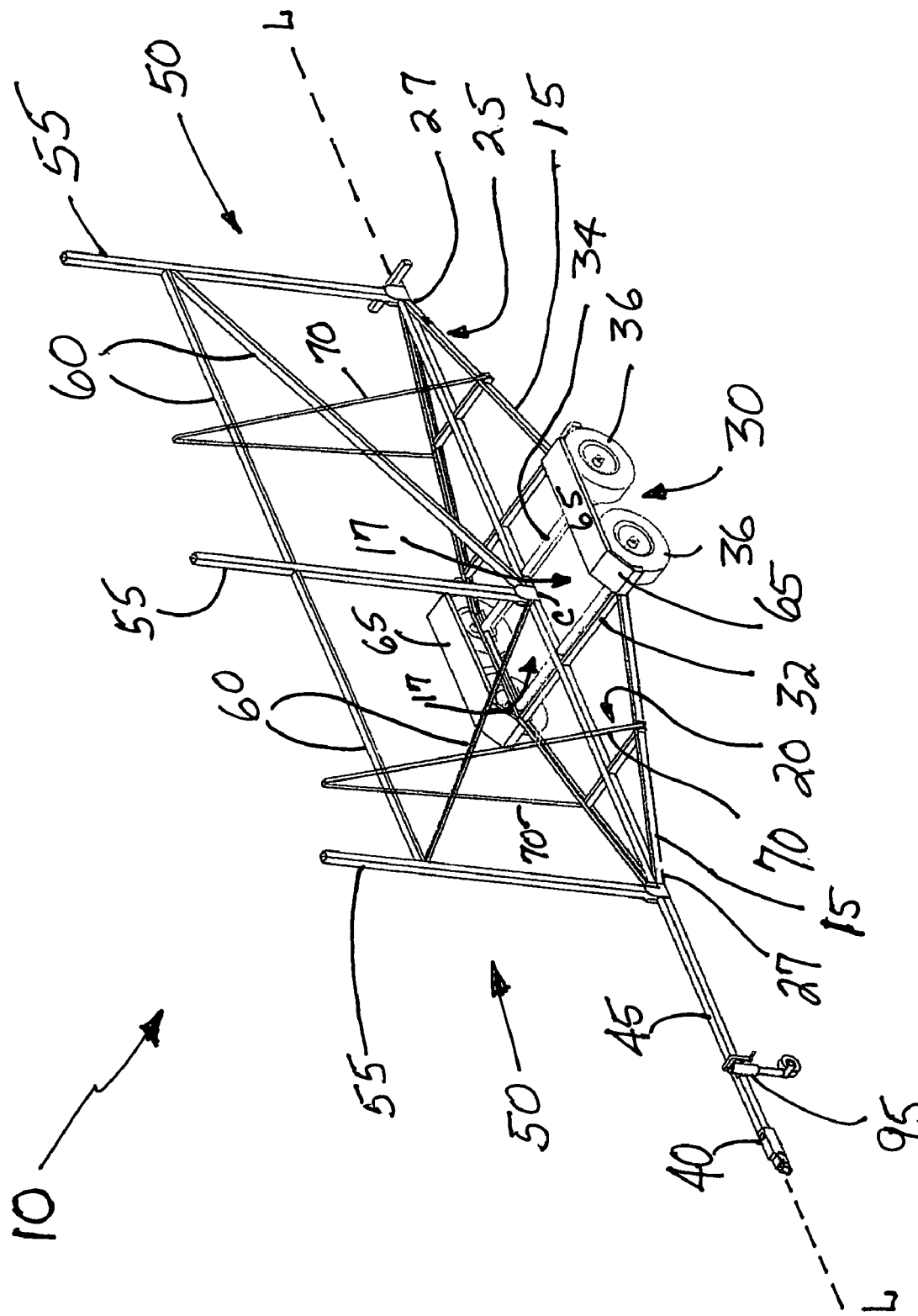
FIG. 1 is a perspective view of one embodiment of the building truss transport trailer device of the present invention.

10 Building Truss Transport Trailer Device
15 Horizontal Bed Frame Section
17 Slot in Bed Frame Section
20 Top Side of Bed Frame Section
25 Bottom Side of Bed Frame Section
27 Pointed Ends of Bed Frame Section
30 Set of Wheels
32 First Axle Member
34 Second Axle Member
36 Wheel Member
40 Terminal Hitch Member
45 Tongue Member of Bed Frame Section
50 Vertical Support Frame Section
55 Vertical Support Members
60 Bracing Members
65 Fender Members
70 Fastening System 75 Ratcheting Strap Assemblies
80 Strap Members
85 Ratcheting Mechanism
90 Running Lights System
95 Tongue Support Device
C Center Point of Frame Bed Section
L Longitudinal Axis of the Frame Bed Section
T Building Trusses Construction The invention is directed to a building truss transport trailer device, adapted for transporting vertically oriented, upright or inverted building trusses. The base of the transport trailer device comprises a horizontal bed frame section, having top and bottom sides and a longitudinal axis. The bed frame section is supported on a set of wheels attached to the bottom side thereof. The bed frame section includes a slot perpendicular to the longitudinal axis, adapted for receiving a point of a building truss. The bed frame section also includes a tongue member with a terminal hitch member, adapted for attachment to a towing vehicle. A vertical support frame section extends from the top side of the bed frame section and is positioned along the longitudinal axis thereof. A fastening system is attached to the bed frame and adapted for fastening a plurality of vertically oriented, upright or inverted building trusses, positioned on the bed frame section and against the vertical support frame section, to the trailer device for transport thereof.

In a preferred embodiment of the invention, the bed frame section of the building truss transport trailer device has a diamond shape, and the tongue member with a terminal hitch member extends from a point of the diamond shape bed frame section on the longitudinal axis thereof. More preferably, the set of wheels includes a pair of axles, bracketing the slot of the bed frame section, with a wheel at each end of each axle. More preferably, the vertical support frame section includes a plurality of vertical support members positioned on the longitudinal axis of the bed frame section with bracing members there between. Most preferably, the plurality of vertical support members includes a vertical support member, extending from each point of the diamond-shaped bed frame section, and a vertical support member, extending from a center point of the bed frame section. Most preferably, the fastening system comprises at least about two ratcheting strap assemblies, each anchored to the bed frame member and adapted for encircling and fastening a plurality of vertically oriented, upright or inverted building trusses, positioned on the bed frame section and against the vertical support frame section, to the trailer device for transport thereof.

In a further embodiment of the invention, the building truss transport trailer device includes a pair of fender members, with each fender member secured to one edge of the bed frame section over the wheel at one end of each axle. Additionally, the building truss transport trailer device includes a running lights system secured to the trailer device and adapted for connection to the electrical system of a towing vehicle.

Referring now to FIG. 1, one embodiment of the building truss transport trailer device 10 invention is illustrated. The building truss transport trailer device 10 is adapted for transporting vertically oriented, upright or inverted building trusses T. The base of the transport trailer device 10 comprises a horizontal bed frame section 15, having a top side 20 and a bottom side 25 and a longitudinal axis L. The bed frame section 15 is supported on a set of wheels 30 attached to the bottom side 25 of the bed frame section 15. The bed frame section 15 includes a slot 17 perpendicular to the longitudinal axis L, the slot 15 being adapted for receiving a point of a building truss T. The bed frame section 15 also includes a tongue member 45 with a terminal hitch member 40, adapted for attachment to a towing vehicle (now shown).

Preferably, the bed frame section 15 is diamond-shaped, and the tongue member 45 with terminal hitch member 40 extends from one pointed end 27 of the diamond-shaped bed frame section 15, on the longitudinal axis L thereof. Most preferably, the set of wheels 30 includes a pair of axles 32, 34, bracketing the slot 17 of the bed frame section 15, with a wheel member 36 at each end of each axle 32, 34.

A vertical support frame section 50 extends from the top side 20 of the bed frame section 15 and is positioned along the longitudinal axis L of the bed frame section 15. More preferably, the vertical support frame section 50 includes a plurality of vertical support members 55, positioned on the longitudinal axis L of the bed frame section 15, with bracing members 60 there between. Most preferably, the plurality of vertical support members 55 includes a vertical support member 55 extending from each pointed end 27 of the diamond-shaped bed frame section 15, and a vertical support member 55 extending from a center point C of the bed frame section 15.

Figure 3:
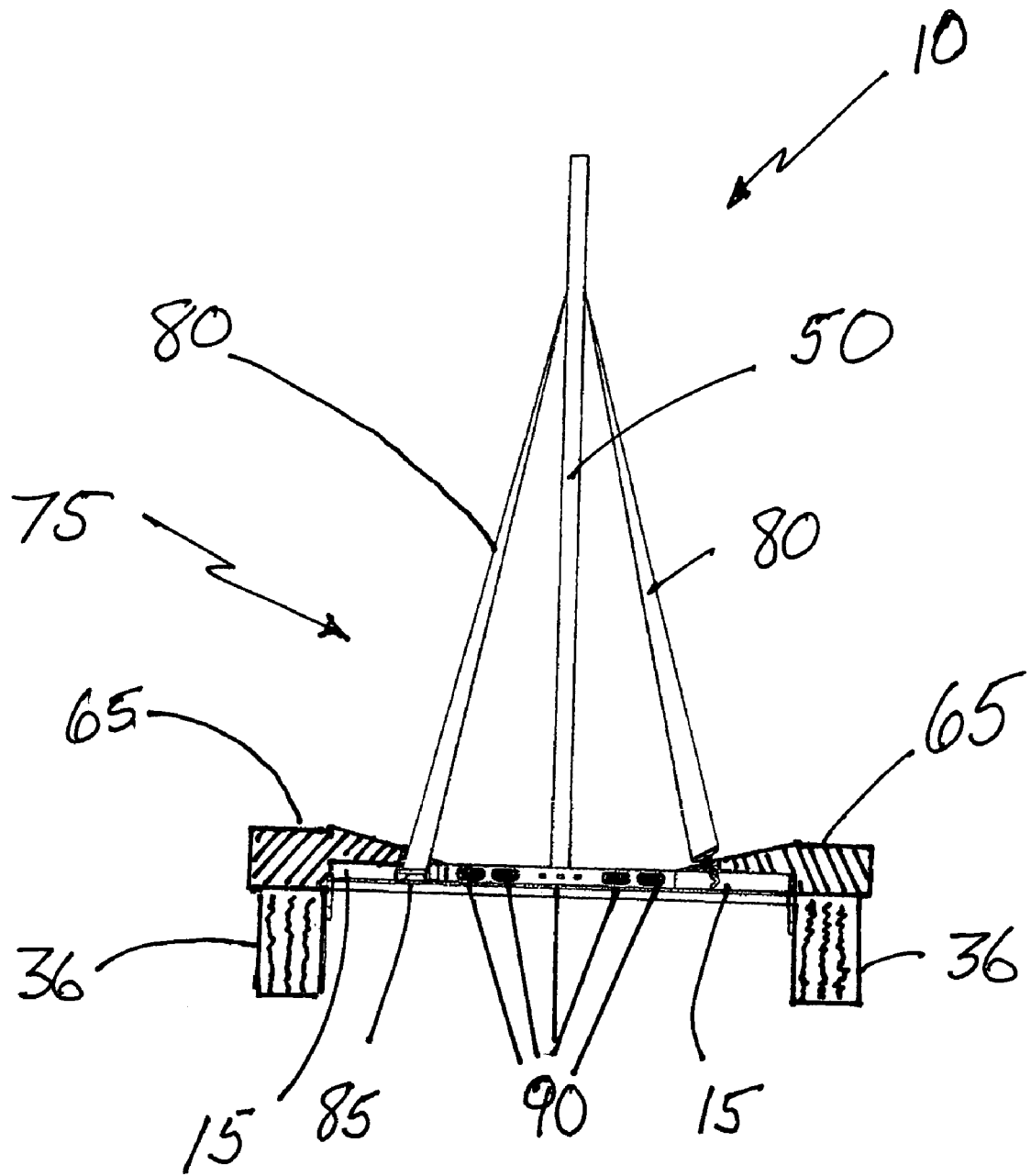
FIG. 3 is a rear view of the building truss transport trailer device of the present invention showing the running light system and the fastening system.

A fastening system 70 is attached to the bed frame section 15 and is adapted for fastening a plurality of vertically oriented, upright or inverted building trusses T, positioned on the bed frame section 15 and against the vertical support frame section 50, to the trailer device 10 for transport thereof. Most preferably, the fastening system 70 comprises at least about two ratcheting strap assemblies 75, each anchored to the bed frame section 15 near one pointed end 27 thereof. Such ratcheting strap assemblies 75 are well-known in the transportation industry. The fastening system 70 is adapted for encircling and fastening a plurality of vertically oriented, upright or inverted building trusses T, positioned on the bed frame section 15 and against the vertical support frame section 50, to the trailer device 10 for transport thereof. The at least about two ratcheting strap assemblies 75 each include a ratcheting mechanism 85 secured to the bed frame section 15 with a connected strap member 80 for encircling the building trusses T and the vertical support frame section 50. The ratcheting mechanism 85 secured to the bed frame section 15 is best seen in FIG. 3, a rear end view of the trailer device 10. Trusses T are loaded and stacked on each side of the vertical support frame section 50 to balance the load of the building truss transport trailer device 10.

In a further embodiment of the invention, the building truss transport trailer device 10 includes a pair of fender members 65, with each fender member 65 secured to one edge of the bed frame section 15 over the wheel member 36 attached at one end of each axle member 32, 34. Additionally, the building truss transport trailer device 10 includes a running lights system 90 secured to the trailer device 10 and adapted for connection to the electrical system of a towing vehicle. The running lights system 90 is shown in FIG. 3. The electrical wires connecting the running lights system 90 to the towing vehicle are omitted in FIGS. 1 and 2 for clarity.

Figure 2:
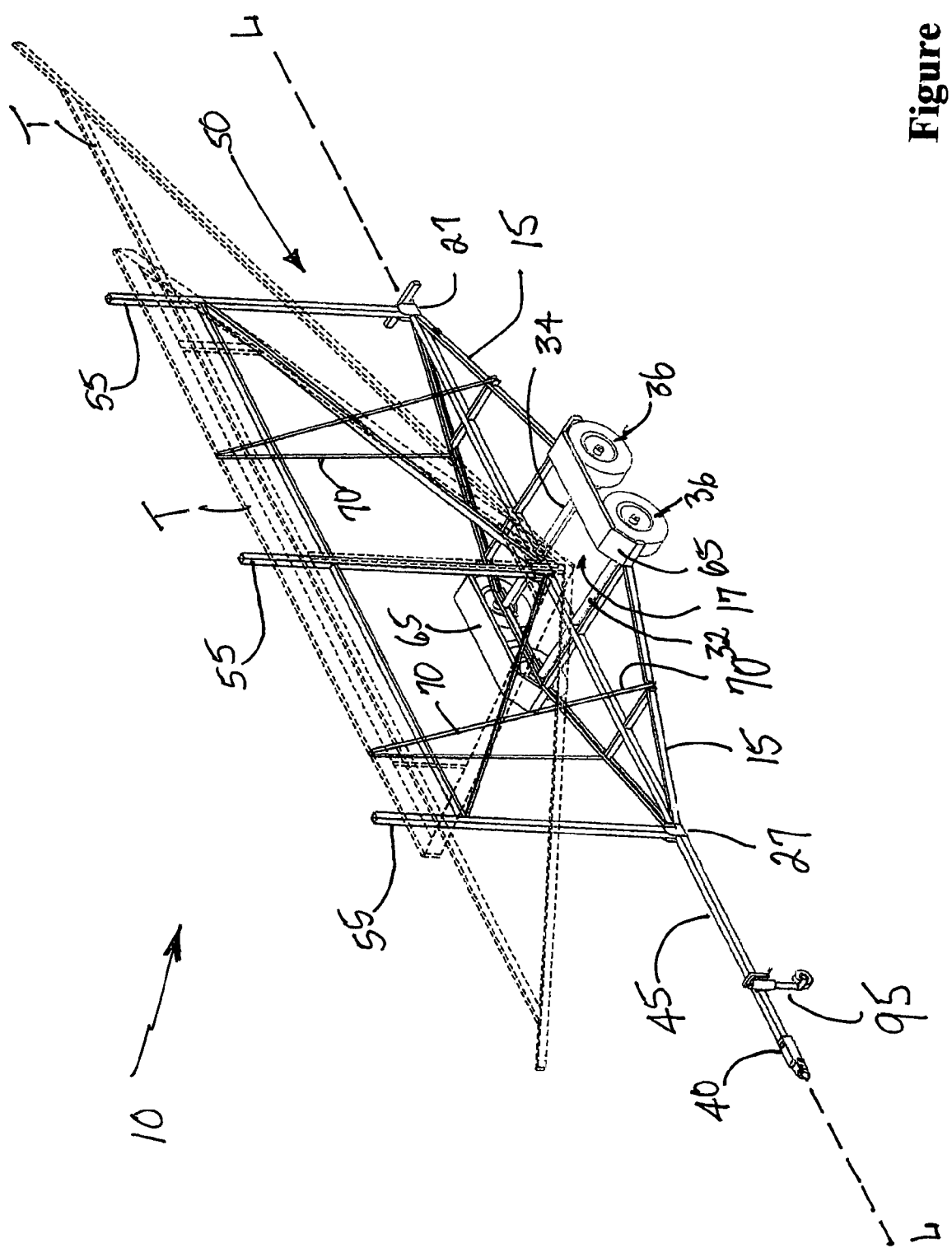
FIG. 2 is another perspective view of the building truss transport trailer device of the present invention with several trusses shown in phantom.

As illustrated in FIG. 2, inverted building trusses T are loaded on the trailer device 10 with the point of each truss T positioned within the slot 17 in the bed frame section 15. The width of the slot 17 is sized so that the points of the trusses T clear the surface beneath the trailer device 10. The inverted, stacked trusses T are held against the vertical support frame section 50 by the fastening' system 70 attached to the bed frame section 15. Alternatively, upright building trusses T are loaded on the trailer device 10 with the flat bottom of each truss T supported upon the bed frame section 15. Again, the upright, stacked trusses T are held against the vertical support frame section 50 by the fastening system 70 attached to the bed frame section 15. As mentioned above, the trusses T are loaded and stacked on each side of the vertical support frame section 50 to balance the load of the building truss transport trailer device 10.

Additionally, a tongue support device 95, such as a telescoping caster wheel assembly, is attached to the tongue member 45 adjacent to hitch member 40. The tongue support device 95 assists in attaching the trailer device 10 to a towing vehicle and in manually moving the trailer device 10 when unattached from the towing vehicle.

While the invention has been particularly shown and described with reference to preferred embodiments thereof, it will be understood by those skilled in the art that various changes in form and details may be made therein without departing from the spirit and scope of the invention.

We claim:

1. A building truss transport trailer device adapted for transporting vertically oriented, upright or inverted building trusses, the truss transport trailer device comprising:

a horizontal bed frame section having top and bottom sides and a longitudinal axis, the bed frame section supported on a set of wheels attached to the bottom side thereof, the bed frame section including a slot perpendicular to the longitudinal axis adapted for receiving a point of a building truss, the bed frame section having a diamond shape with a tongue member extending from a pointed end of the bed frame section on the longitudinal axis thereof, the tongue member having a terminal hitch member adapted for attachment to a towing vehicle;

a vertical support frame section extending from the top side of the bed frame section and positioned along the longitudinal axis thereof, the vertical support frame section including a plurality of vertical support members with bracing members there between, including a vertical support member extending from each pointed end of the diamond-shaped bed frame section and a vertical support member extending from a center point of the bed frame section; and a fastening system adapted for fastening a plurality of vertically oriented, upright or inverted building trusses, positioned on the bed frame section and against the vertical support frame section, to the trailer device for transport thereof.

2. The building truss transport trailer device of claim 1, further including a running lights system secured to the truss transport trailer device and adapted for connection to an electrical system of a towing vehicle.

3. The building truss transport trailer device of claim 1, wherein the set of wheels includes a pair of axles bracketing the slot of the bed frame section with a wheel at each end of each axle.

4. The building truss transport trailer device of claim 1, wherein the fastening system comprises at least about two ratcheting strap assemblies, each anchored to the bed frame member and adapted for encircling and fastening a plurality of vertically oriented, upright or inverted building trusses, positioned on the bed frame section and against the vertical support frame section, to the trailer device for transport thereof.

5. The building truss transport trailer device of claim 1, further including a pair of fender members, each fender member secured to one edge of the bed frame section over the wheel at one end of each axle.

6. A building truss transport trailer device adapted for transporting vertically oriented, upright or inverted building trusses, the truss transport trailer device comprising:

a horizontal bed frame section having top and bottom sides and a longitudinal axis, the bed frame section supported on a set of wheels attached to the bottom side thereof, the bed frame section including a slot perpendicular to the longitudinal axis adapted for receiving a point of a building truss, the set of wheels including a pair of axles bracketing the slot of the bed frame section with a wheel at each end of each axle, the bed frame section including a pair of fender members, each fender member secured to one edge of the bed frame section over the wheel at one end of each axle, the bed frame section having a diamond shape with a tongue member extending from a pointed end of the bed frame section on the longitudinal axis thereof, the tongue member having a terminal hitch member adapted for attachment to a towing vehicle;

a vertical support frame section extending from the top side of the bed frame section and positioned along the longitudinal axis thereof, the vertical support frame section including a plurality of vertical support members with bracing members there between, including a vertical support member extending from each pointed end of the diamond-shaped bed frame section and a vertical support member extending from a center point of the bed frame section; and a fastening system adapted for fastening a plurality of vertically oriented, upright or inverted building trusses, positioned on the bed frame section and against the vertical support frame section, to the trailer device for transport thereof.

7. The building truss transport trailer device of claim 6, further including a running lights system secured to the truss transport trailer device and adapted for connection to an electrical system of a towing vehicle.

8. The building truss transport trailer device of claim 6, wherein the fastening system comprises at least about two ratcheting strap assemblies, each anchored to the bed frame member and adapted for encircling and fastening a plurality of vertically oriented, upright or inverted building trusses, positioned on the bed frame section and against the vertical support frame section, to the trailer device for transport thereof.

9. A building truss transport trailer device adapted for transporting vertically oriented, upright or inverted building trusses, the truss transport trailer device comprising:

a horizontal bed frame section having top and bottom sides and a longitudinal axis, the bed frame section supported on a set of wheels attached to the bottom side thereof, the bed frame section including a slot perpendicular to the longitudinal axis adapted for receiving a point of a building truss, the set of wheels including a pair of axles bracketing the slot of the bed frame section with a wheel at each end of each axle, the bed frame section including a pair of fender members, each fender member secured to one edge of the bed frame section over the wheel at one end of each axle, the bed frame section having a diamond shape with a tongue member extending from a pointed end of the bed frame section on the longitudinal axis thereof, the tongue member having a terminal hitch member adapted for attachment to a towing vehicle;

a vertical support frame section extending from the top side of the bed frame section and positioned along the longitudinal axis thereof, the vertical support frame section including a plurality of vertical support members with bracing members there between, including a vertical support member extending from each pointed end of the diamond-shaped bed frame section and a vertical support member extending from a center point of the bed frame section;
a fastening system adapted for fastening a plurality of vertically oriented, upright or inverted building trusses, positioned on the bed frame section and against the vertical support frame section, to the trailer device for transport thereof; and
a running lights system secured to the truss transport trailer device and adapted for connection to an electrical system of a towing vehicle.

10. The building truss transport trailer device of claim 9, wherein the fastening system comprises at least about two ratcheting strap assemblies, each anchored to the bed frame member and adapted for encircling and fastening a plurality of vertically oriented, upright or inverted building trusses, positioned on the bed frame section and against the vertical support frame section, to the trailer device for transport thereof.

* * * * *